(12) United States Patent
Abraham et al.

(10) Patent No.: US 8,605,579 B2
(45) Date of Patent: Dec. 10, 2013

(54) METHOD AND APPARATUS FOR FLOW CONTROL OF DATA IN A MESH NETWORK

(75) Inventors: Santosh Abraham, San Diego, CA (US); Saishankar Nandagopalan, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1135 days.

(21) Appl. No.: 11/549,823

(22) Filed: Oct. 16, 2006

(65) Prior Publication Data

US 2007/0127380 A1 Jun. 7, 2007

Related U.S. Application Data

(60) Provisional application No. 60/727,641, filed on Oct. 17, 2005.

(51) Int. Cl.
*H04L 12/26* (2006.01)

(52) U.S. Cl.
USPC ........................................ 370/230; 370/395.4

(58) Field of Classification Search
USPC ................................................ 370/229–462
See application file for complete search history.

(56) References Cited

U.S. PATENT DOCUMENTS

| | | | | |
|---|---|---|---|---|
| 2004/0013089 | A1* | 1/2004 | Taneja et al. | 370/235 |
| 2004/0165530 | A1* | 8/2004 | Bedekar et al. | 370/235 |
| 2005/0163111 | A1* | 7/2005 | Ishii et al. | 370/360 |
| 2005/0185583 | A1* | 8/2005 | Hosein | 370/232 |
| 2005/0270975 | A1 | 12/2005 | Meylan et al. | |
| 2005/0271019 | A1* | 12/2005 | Yuan et al. | 370/338 |
| 2005/0286440 | A1* | 12/2005 | Strutt et al. | 370/253 |
| 2006/0045094 | A1* | 3/2006 | Yun et al. | 370/395.4 |
| 2006/0056382 | A1* | 3/2006 | Yamada et al. | 370/349 |
| 2006/0133272 | A1* | 6/2006 | Yuan et al. | 370/230 |
| 2008/0062878 | A1* | 3/2008 | Habetha et al. | 370/235 |

FOREIGN PATENT DOCUMENTS

| | | |
|---|---|---|
| JP | 2005086304 A | 3/2005 |
| JP | 2005086816 A | 3/2005 |
| WO | WO9903224 A1 | 1/1999 |
| WO | WO03007510 A2 | 1/2003 |

(Continued)

OTHER PUBLICATIONS

Wing Fai Fan et al., "Admission control for variable bit rate traffic using variable service interval in IEEE 802.11e WLANs," Computer Communications and Networks, 2004, pp. 447-453, IEEE 13th International Conference on Chicago, IL.

(Continued)

*Primary Examiner* — Obaidul Huq
(74) *Attorney, Agent, or Firm* — Charles E. Eggers

(57) ABSTRACT

Flows admitted to a mesh node may be controlled through contention access parameters. The admitting node may determine a desired transmission opportunity duration, and a transmission opportunity frequency. Furthermore, the node may achieve the flow rate and delay bound requirements of the admitted flow based at least in part upon the desired transmission opportunity duration, and the transmission opportunity frequency. The data rate and the access frequency of the admitted node may be monitored at the physical access level. The flow rate requirement may be accomplished based at least in part upon an adjustment to the transmission opportunity duration. The delay bound requirement may be accomplished at least in part upon manipulation of the contention access parameters. The transmission opportunity duration and the access parameters may be determined by the upstream admitting nodes, which may reduce congestion near mesh portals, and accomplish increased data transfer.

49 Claims, 5 Drawing Sheets

(56) References Cited

FOREIGN PATENT DOCUMENTS

| WO | 03/085891 A | 10/2003 |
|---|---|---|
| WO | 2004/036838 A2 | 4/2004 |
| WO | WO2004077225 A2 | 9/2004 |
| WO | WO2004109536 A1 | 12/2004 |
| WO | WO2005066914 A1 | 7/2005 |
| WO | WO2005079027 | 8/2005 |
| WO | WO2005122506 | 12/2005 |

OTHER PUBLICATIONS

Wing Fai Fan et al., "Admission control for variable bit rate traffic in IEEE 802.113 WLANs," Communications, 2004, pp. 272-277, IEEE 5th International Symposium on Multi-dimensional mobile communications proceedings, Beijing, China.

Del Prado et al., "Normative text for mandatory TSPEC parameters and informative text for a simple scheduler," IEEE 802.11-02/705R0, 2002, pp. 1-4.

Mangold et al., "IEEE 802.11e Wireless LAN for Quality of service," Internet Citation Feb. 2002, URL: <http//comnets.rwth-aachen.de/cnroot.html> Retrieved on Aug. 18, 2003.

Cicconetti et al., "A scheduling algorithm for providing real-time guarantees in 802.11e WLANs," Broadband Networks, 2005, pp. 836-838, IEEE 2005 2nd International Conference on Boston, MA.

Shankar et al., "TXOP request: in time vs. queue size," Internet Citation May 2002, URL:<http://grouper.ieee.org/groups/802/11/Documents/D2t301-350.html> Retrieved on Mar. 16, 2005.

Bobby Jose, "Contention Free TXOP request and allocation issues," IEEE 802.11-02/248R0, 2002, pp. 1-27.

Deyun Gao et al., "Physical Rate based admission control for HCCA in IEEE 802.11e WLANs," Advanced Information Networking and Applications, 2005, pp. 479-483, IEEE 19th International Conference on Taipei, Japan.

International Search Report and Written Opinion—PCT/US2006/040710, International Search Authority—European Patent Office—Feb. 12, 2007.

Taiwanese Search report—095138304—TIPO—Apr. 25, 2010.

Li Y., et al., "Access Point Power Saving in Solar/Battery Powered IEEE 802.11 Ess Mesh Networks", Quality of Service in Heterogeneous Wired/Wireless Networks, 2005. Second International Conference on Orlando, FL, USA Aug. 22-24, 2005, Piscataway, NJ, USA, IEEE, Aug. 22, 2005 (2005-08-22), pp. 49-49, XP010859439, DOI: 10.1 109IQSHINE.2005.5 ISBN : 978-0/7695-2423-8.

* cited by examiner

METHOD AND APPARATUS FOR FLOW CONTROL OF DATA IN A MESH NETWORK

CLAIM OF PRIORITY UNDER 35 U.S.C. §119

The present Application for patent claims priority to Provisional Application No. 60/727,641 filed Oct. 17, 2005, and assigned to the assignee hereof and hereby expressly incorporated by reference herein.

BACKGROUND

1. Field

The disclosure may relate to mesh networks. More particularly, the disclosure may relate to a method and apparatus for flow control of data in a mesh network.

2. Background

In recent years, there has been an increase in demand for widespread access to high speed data services. The telecommunication industry has responded to the increase in demand by offering a variety of wireless products and services. In an effort to make these products and services interoperable, the Institute for Electrical and Electronics Engineers (IEEE) has promulgated a set of wireless local area network (WLAN) standards, e.g., IEEE 802.11. The products and services that conform to these standards are frequently networked in a wireless point to multipoint configuration. In one configuration, individual wireless devices (e.g., stations) may communicate directly with an Internet access point, with each of the wireless devices sharing the available bandwidth.

Another configuration may be a mesh network. A mesh network may be a distributed network having multiple wireless nodes. Each node may act as a repeater capable of receiving traffic, transmit or transport streams (TSs) and relaying the TSs to a next node. A TS may proceed from an origination node to a destination node by "hopping" from node to node. TS routing algorithms may insure that TSs are routed efficiently from their origination node to their destination node. TS routing algorithms may dynamically adapt to changes in the mesh network and may enable the mesh network to be more efficient and resilient. For example, in the event a node is too busy to handle the TS or a node has dropped out of the mesh network, the TS routing algorithm may route the TS to the destination node through other nodes in the network.

The destination node may be a mesh portal. TS arriving at the mesh portal may be decoded and reformatted for retransmission over other wired, or potentially wireless, networks, for example, the Internet. A traffic flow originating at a mesh node and traveling to the mesh portal may be referred to as an upstream traffic flow. A traffic flow originating at the mesh portal and traveling to a destination node may be referred to as a downstream traffic flow. A node one away from a mesh portal may be said to be a node of rank 1. Similarly, a node that requires at least two hops to reach a mesh portal may be said to be a node of rank 2. In general, a node that requires n hops to reach a mesh portal is said to be a node of rank n.

Large percentages of a mesh network's traffic flows may be upstream and downstream flows that terminate and originate at mesh portals. Upstream traffic flows may hop from higher ranked nodes to lower ranked nodes before departing through the mesh portal. Downstream flows may hop from lower ranked nodes to higher ranked nodes before reaching a destination node. Thus, lower rank nodes support the traffic flows of higher rank nodes. In general, nodes of rank 1 have more traffic flow than nodes of rank 2. Similarly, nodes of rank 2 have more traffic than nodes of higher ranks, such as 3, 4, 5, etc. Neighboring nodes may be defined as nodes one hop away from a reference node.

The mesh network, where lower rank nodes support upstream and downstream traffic flows from higher rank nodes, may often result in flow congestion at mesh nodes near the mesh portals. Many factors contribute to flow congestion including, but not limited to, neighboring nodes attempting to access the communication channel medium too frequently, neighboring nodes transmitting at lower data rates than optimum at the physical access layer, neighboring nodes transmitting bursts that occasionally exceed the negotiated access throughput, and poor radio conditions between the mesh node and the upstream nodes resulting in a lower than expected throughput, among other factors.

SUMMARY

According to aspects of this disclosure, traffic flows may be individually managed by each mesh node. Before receiving a traffic flow, a receiving mesh node may receive a traffic specification from a transmitting mesh node. The traffic specification may include parameters such as, but not limited to, a flow rate (FR) and a delay bound (DB) for the traffic flow, among other parameters. The transmitting mesh node may estimate the achievable media access control (MAC) throughput (TPUT) and may transmit the estimated MAC TPUT to the receiving mesh node. Based at least in part on the received FR, DB, and TPUT information, the receiving mesh node may calculate a desired transmission opportunity (TxOP) duration, and a desired access frequency for the transmitting mesh node. This calculation may also be based at least in part on other parameters. The receiving mesh node may assign and broadcast contention access parameters to the transmitting mesh node. The receiving mesh node may measure the achieved TPUT, and if it is determined that the achieved TPUT is less than the estimated TPUT, the mesh node may increase the TxOP duration. The receiving mesh node may also measure the access frequency. If it is determined that the access frequency is greater than the desired access frequency, the mesh node may adjust the access parameters to decrease the access frequency.

A method for controlling the flow of data comprising receiving a flow rate of data from a mesh node, measuring a channel characteristic of the data received from the mesh node, determining a desired transmission rate based at least in part on the channel characteristic, and determining a transmission opportunity duration to achieve the flow rate at the desired transmission rate.

BRIEF DESCRIPTION OF THE DRAWINGS

Claimed subject matter is particularly pointed out and distinctly claimed in the concluding portion of the specification. However, such subject matter may be understood by reference to the following detailed description when read with the accompanying drawings in which:

DETAILED DESCRIPTION

Methods and apparatus that implement the embodiments of the various features of the disclosure will now be described with reference to the drawings. The drawings and the associated descriptions are provided to illustrate one or more aspects of the disclosure and not to limit the scope of the disclosure. Throughout the drawings, reference numbers are re-used to indicate correspondence between referenced elements. In addition, the first digit of each reference number indicates the figure in which the element first appears.

Figure 1:
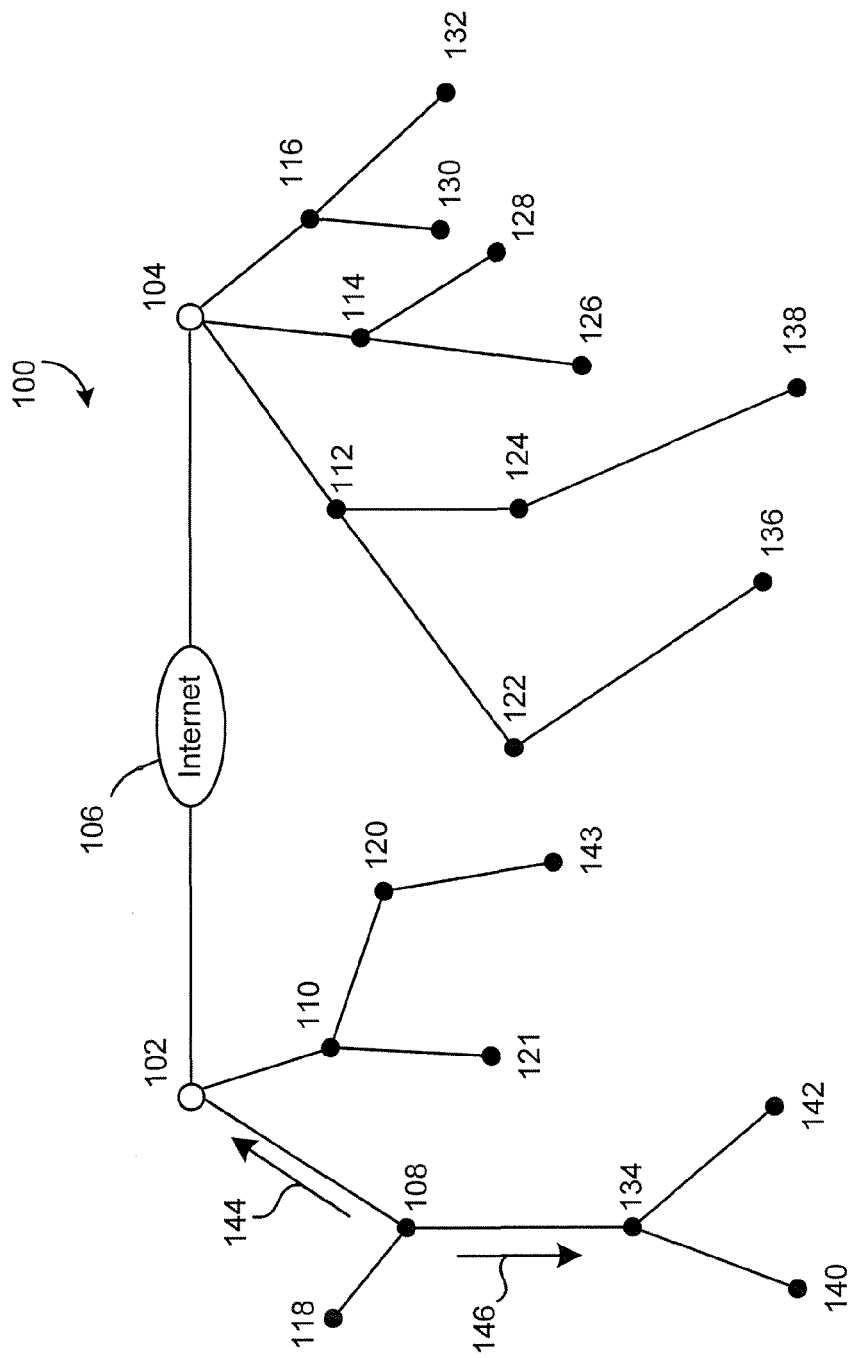
FIG. 1 is a mesh network according to one or more aspects.

FIG. 1 shows a mesh network 100 according to an embodiment. The mesh network 100 may include one or more mesh portals, for example two mesh portals 102 and 104, coupled to the Internet 106. The mesh portals 102 and 104 may receive TSs from mesh nodes 108, 110, 112, 114 and 116. In an aspect, the mesh nodes 108, 110, 112, 114 and 116 are one hop away from a mesh portal and have rank 1. The mesh nodes 108, 110, 112, 114 and 116 may receive TSs from mesh nodes 118, 120, 121, 122, 124, 126, 128, 130, 132 and 134. The mesh nodes 118, 120, 121, 122, 124, 126, 128, 130, 132 and 134 may not be capable of transmitting TSs to the mesh portals 102 and 104 in less than two hops, and thus are considered to have rank 2. The mesh nodes 120, 122, 124 and 134 may receive TSs from mesh nodes 136, 138, 140, 142 and 143. Since three hops is the minimum number of hops needed for TSs from the mesh nodes 136, 138, 140, 142 and 143 to reach a mesh portal, they may be considered to have rank 3.

The TSs in the mesh network 100 may include, for example, upstream traffic flows 144 and downstream traffic flows 146. The upstream traffic flows 144 may include TSs that flow toward a mesh portal. The downstream traffic flows 146 may include TSs that flow away from a mesh portal. The upstream traffic flows and the downstream traffic flows may have the same or similar route between nodes. For example, an upstream traffic flow from mesh node 140 to mesh portal 102 may hop from mesh node 140, to mesh node 134, to mesh node 108, to mesh portal 102. A downstream traffic flow from mesh portal 102 to mesh node 140 may similarly hop from mesh portal 102, to mesh node 108, to mesh node 134, to mesh node 140.

The upstream and downstream traffic flows may also have different routes. For example, an upstream traffic flow from mesh node 140 to mesh portal 102 may hop from mesh node 140, to mesh nodes 134, to mesh node 108, to mesh portal 102. The downstream traffic flow from mesh portal 102 to mesh node 140 may hop from mesh portal 102, to mesh node 110, to mesh node 114, to mesh node 134, to mesh node 140. In this example, there is a hop from mesh node 110 of rank 1 to mesh node 114 of rank 1.

The traffic flows in the mesh network 100 may be dynamic and adaptable. The traffic flow topology may be determined by traffic flow routing algorithms. The route of upstream and downstream traffic flows may include hops to mesh nodes of the same rank. The traffic flow routing algorithms may generate upstream routes having hops to mesh nodes of higher and lower ranks. Similarly, the traffic flow routing algorithms may generate downstream routes having hops to mesh nodes of higher and lower ranks. Once a route is generated, admission to each mesh node along the route may be individually negotiated between the transmitting mesh node and the receiving mesh node.

Figure 2:
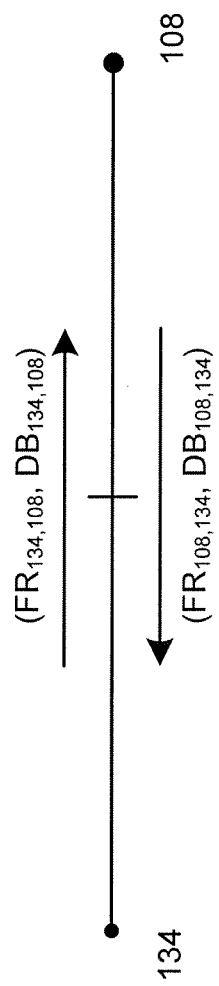
FIG. 2 is a flow diagram of admission control for upstream and downstream traffic flows between two mesh nodes of FIG. 1 according to one or more aspects.

FIG. 2 is a flow diagram of admission control for upstream and downstream traffic flows between two mesh nodes 108 and 134 of FIG. 1 according to one or more aspects. The mesh node 134 may negotiate admission of an upstream traffic flow to mesh node 108 by sending mesh node 108 a transmit specification including a traffic flow rate ($FR_{134,108}$) and a delay bound ($DB_{134,108}$). The FR may be the average bit rate of the data flow. The FR may be, for example, 4 megabytes per second. The DB may be the maximum allowable data latency. The DB requirements may relate to Quality of Service (QoS) requirements. For example, a high quality two way voice application may tolerate a very short data latency on the order of 50 milliseconds, for example. The DB for this voice application would be very small. In contrast, other applications, such as text messaging, may tolerate fairly large data latencies on the order of many seconds, which may result in a relatively large DB. If it is determined that mesh node 108 has adequate capacity to handle the TS, the TS may be admitted to mesh node 108.

The downstream traffic flows may be negotiated in a similar manner. The mesh node 108 may negotiate admission of a downstream traffic flow to mesh node 134 by sending mesh node 134 a transmit specification that may include a traffic flow rate ($FR_{108,134}$) and a delay bound ($DB_{108,134}$). If it is determined that mesh node 134 has adequate capacity to handle the TS, the TS may be admitted to mesh node 134.

Also, the upstream and downstream traffic flows may be negotiated jointly. The mesh node 134 may negotiate admission of both the upstream traffic flow and the downstream traffic flow between the mesh nodes 108 by sending a joint FR and DB.

After admission is granted, the lower layer of the MAC and the physical access layer (PHY) may establish a data link and adapt the link to optimize the link TPUT. Multiple input, multiple output (MIMO) technology, closed loop rate control, and other link optimization technologies may also be utilized to maximize TPUT.

Figure 3:
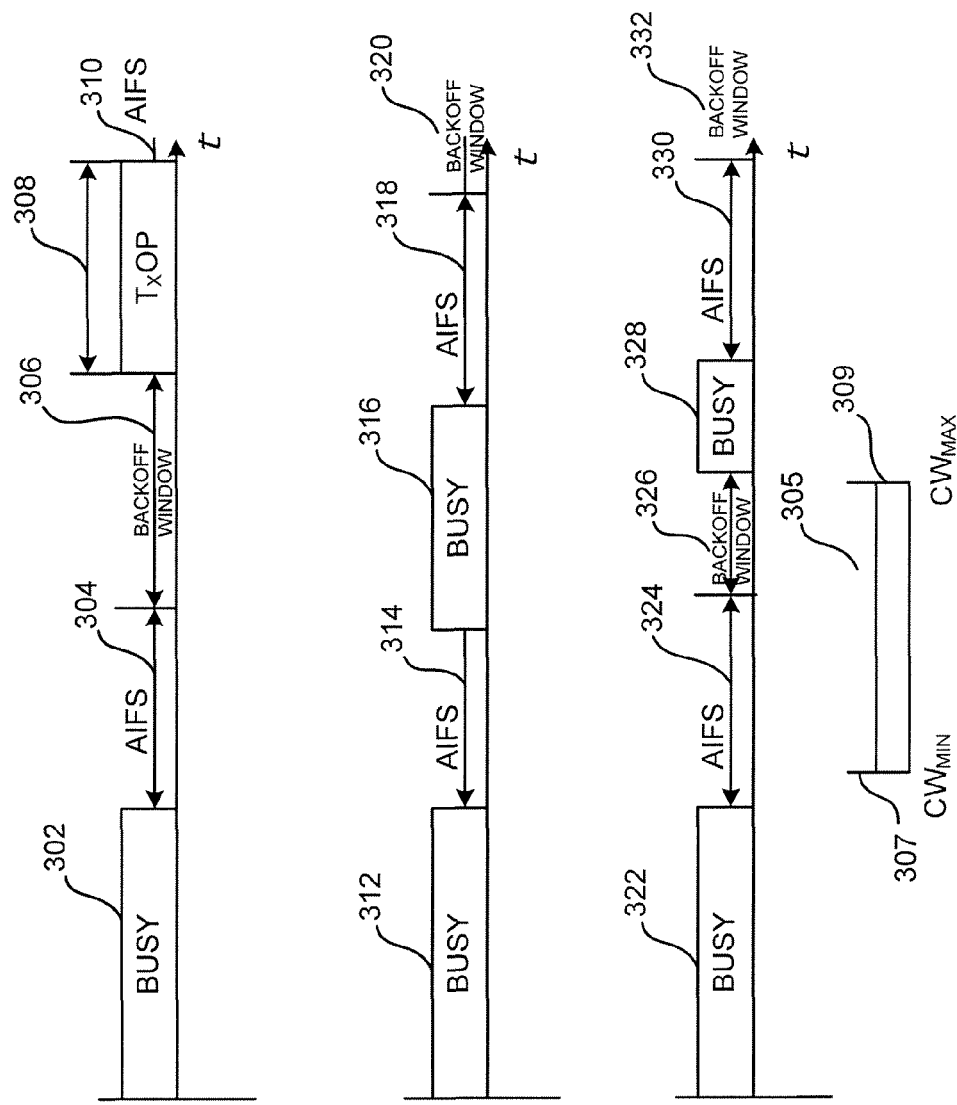
FIG. 3 shows timing diagrams illustrating contention access control at a mesh node according to one or more aspects.

FIG. 3 shows timing diagrams illustrating contention access control at a mesh node according to one or more aspects. The admission or flow access to a receiving mesh node may be managed using a contention access scheme. The receiving mesh nodes may control access to the communication channel by assigning channel access parameters to the transmitting mesh nodes. The channel access parameters may include the TxOP duration, a contention window (CW) minimum, and an arbitration inter-frame space (AIFS) time. The transmitting mesh nodes may monitor the communication channel, and when the communication channel becomes available, the transmitting mesh nodes may idle for a wait time equal to their respective assigned AIFS time before transmitting a TS during a TxOP. During the AIFS time, the idling transmitting mesh nodes may continue to monitor the communication channel, and if the communication channel becomes busy, the transmitting mesh nodes may continue to idle and wait until the communication channel becomes available again. The idling transmission mesh nodes may then wait another time period equal to their respective assigned AIFS time. When the communication channel has been available for a time period equal to its AIFS time, the transmitting mesh node may set a backoff timer. The length of time set on the backoff timer may be random. The random time may be determined by a number drawn from a uniform distribution over the assigned CW.

Three possible outcomes of contention access control are shown in FIG. 3. The first outcome may be when a mesh node successfully contends for access control when the communication channel becomes available. The timeline begins with the mesh node monitoring a busy 302 communication channel. While the communication channel is busy 302, the transmitter of the mesh node may idle. When the communication channel becomes available, the transmitter of the mesh node may continue to idle for a time period equal to the AIFS time 304. While idling, the mesh node may continue to monitor the communication channel. At the end of the AIFS time 304, the mesh node may randomly select a backoff window slot 306 by, for example, selecting a slot from a uniform distribution 305 between 0 and minimum $CW_{min}$ 307 and then doubling the $CW_{min}$ every time there is a packet failure until it reaches a maximum $CW_{max}$ 309. The backoff window time is determined by multiplying the selected backoff window slot 306 by a slot time as defined in the IEEE 802.11n standard, which may define, at least in part, the length of the backoff window. The transmitter of the mesh node may continue to be idle until a backoff timer counts a length of time equal to the backoff window. While idling, the mesh node may continue to monitor the communication channel. At the end of the backoff window slot 306, the transmitter may have a TxOP 308 during which the transmitting mesh node may transmit information (e.g., TSs) to the receiving mesh node. At the end of the TxOP, the transmitter of the mesh node may be idle once again, and may begin to wait the AIFS time 304, beginning the contention access process once again.

Another possible outcome of contention access control may occur when another mesh node interrupts during an AIFS time 314. The timeline begins with a mesh node monitoring a busy 312 communication channel. When the communication channel becomes available, the transmitter of the mesh node may idle, and may continue to idle for a time period equal to the AIFS time 314. During the AIFS time 314, another mesh node with a shorter AIFS time may begin transmitting and the communication channel may become busy 316 again. The transmitter of the mesh node may continue to idle awaiting the communication channel to become available again. When the communication channel becomes available, the mesh node may wait another AIFS time 318 before selecting a backoff window time 320 and starting the backoff window counter.

Another possible outcome of contention access control may occur when another mesh node interrupts during a backoff window time 326. The timeline begins with the mesh node monitoring the communication channel while the channel is busy 322. During this time, the transmitter of the mesh node may idle. When the communication channel becomes available, the transmitter of the mesh node may continue to idle for a time period equal to the AIFS time 324. While idling, the mesh node may continue to monitor the communication channel. At the end of the AIFS time 324, the mesh node may randomly select a backoff window slot 326 by, for example, selecting a slot from a uniform distribution 305 between 0 and minimum $CW_{min}$ 307 and then doubling the $CW_{min}$ every time there is a packet failure until it reaches a maximum $CW_{max}$ 309. The backoff window time is determined by multiplying the selected backoff window slot 326 by a slot time as defined in the IEEE 802.1. In standard, which may define, at least in part, the length of the backoff window. The transmitter of the mesh node may continue to idle until the backoff timer counts a length of time equal to the backoff window slot 326. While idling, the mesh node may continue to monitor the communication channel. While the backoff counter is counting, another mesh node may begin transmitting and the communication channel may again become busy 328. If this occurs, the backoff counter may be stopped. When the communication channel becomes available, the transmitter of the mesh node may continue to idle, and may wait a time period equal to the AIFS time 330. At the end of the AIFS time 330, the backoff counter may begin counting again from the point where is stopped, instead of starting over.

The FR may be controlled by adjusting the TxOP duration, $CW_{min}$, and AIFS time. A large TxOP may allow a transmitting mesh node to transmit a large amount of information when the transmitting mesh node accesses the medium to send data to a receiving mesh node, which may result in a large FR. A small AIFS time relative to neighboring nodes contending for access to the receiving mesh node may increase the likelihood of access, which may result in a large number of TxOPs, and a large FR. Likewise, a small $CW_{min}$ relative to neighboring nodes may increase the likelihood of selecting a small backoff window time, and may increase the likelihood of access to the receiving node, which may result in a large number of TxOPs and a large FR. Similarly, a small TxOP, a large AIFS time, or a large $CW_{min}$ may result in a small FR.

The DB may also be controlled by adjusting TxOP, $CW_{min}$ and AIFS time, among other parameters. To decrease the DB, the $CW_{min}$ or AIFS time may be decreased, increasing the likelihood of accessing the receiving mesh node. To compensate for more frequent access, the TxOP duration may be decreased to free up communication channel capacity for other mesh nodes. Increasing DB by increasing successful medium access may affect other considerations and/or parameters. Each medium access may have MAC overhead. This MAC overhead may consume communication channel bandwidth that would otherwise be available for traffic flows.

To control congestion at the receiving mesh node, the receiving mesh node may assign a TxOP duration, a $CW_{min}$ and a AIFS time to each of the transmitting mesh nodes that have been admitted. These parameters may be broadcast in the beacon of the receiving mesh node. The receiving mesh node may assign these values based at least in part upon the FR and DB requirements of the transmitting mesh node, as well as the measured TPUT at the receiving mesh node, among other considerations and/or parameters. This calculation may be based at least in part upon other parameters.

At the network level, each receiving mesh node may determine which flows it will admit, and the access control parameters of the transmitting mesh node. For upstream traffic flows, the mesh nodes closest (e.g., rank 1) to the mesh portal may perform admission control, and may determine the access control parameters of mesh nodes further (e.g., rank 2) from the mesh portal. Therefore, the mesh nodes with the lowest rank may be more likely to be the busiest, and may manage access control to the communication channel.

Flow control using medium access parameters such as TxOP duration, $CW_{min}$ and AIFS time may be more suitable for relatively constant traffic flows and slowly varying traffic flows. However, because of the statistical nature of flow control using access control parameters, there may be conditions when explicit messaging may be used to limit the traffic flows to and from higher ranked nodes. Explicit messaging may be used to complement flow control using access control parameters. Explicit messaging may be particularly beneficial when traffic flows are high during short periods, which may cause traffic flow congestion.

Figure 4:
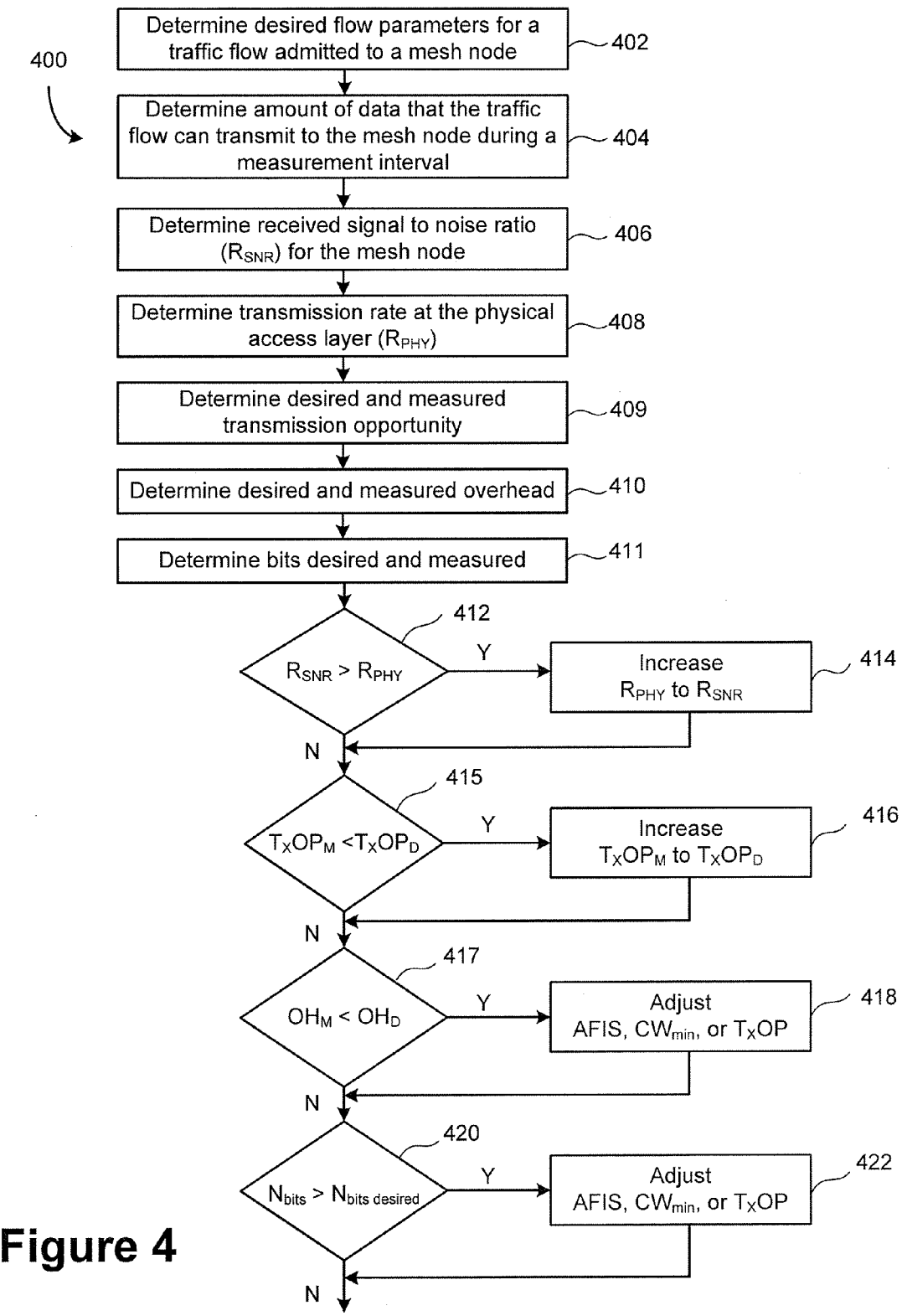
FIG. 4 is a flow diagram illustrating MAC at a mesh node according to one or more aspects.

FIG. 4 is a flow diagram 400 illustrating MAC at a mesh node according to one or more aspects. For each traffic flow admitted to a mesh node, the mesh node may determine desired flow parameters (402). In one or more aspects, the desired flow parameters may include the desired number of bits received over a measurement interval (MI), the desired number of medium accesses over a MI and other parameters. The desired flow parameters may relate to the FR and the DB. For relatively optimum utilization of the medium, the desired number of bits received may be the number of bits received at the FR. Furthermore, the desired number of medium accesses may be the number of accesses required by the DB. The desired flow parameters may be characterized at least in part by the equations:

The number of bits (Nbits) that can be transmitted in the MI is given by:

$$Nbits = MI*FR$$

This information is then used to determine the amount of data that the particular traffic flow can transmit to the receiving node during a MI (404). If the packet size is L, then the number of packets that can be transmitted during a MI is $$N_{packets}^{MI}$$

and is given by:

$$N_{packets}^{MI} = \frac{Nbits}{L}$$

To meet the DB, the number of accesses (Nacc) required over the MI is chosen to permit P>1 accesses during a DB period:

$$Nacc = \frac{MI}{P*DB}$$

If the transmitting node has been allocated a TxOP limit by the receiving node during the setup of TS, then the number of access required is given by:

$$Nacctxop = \frac{MI}{P*DB} \times \frac{N_{packets}^{TXOP}}{N_{packets}^{MI}}$$

Here $$N_{packets}^{MI}$$

is the number of packets that can be sent in a MI and $$N_{packets}^{TXOP}$$

is the number of packets sent for every TxOP. This number is determined from the TxOP limit set by the receiving node.

Having known the above parameters based on the TS admission, the receiving node monitors the transmitting nodes' FR during every MI. The receiving node determines the received SNR of each packet and then calculates the average SNR to arrive at the PHY rate R that can be achieved on the link from the transmitting node. The number of packets that can be transmitted per TXOP is given by:

$$N_{packets}^{TXOP} = \frac{TXOP}{\frac{L}{R} + O}.$$

The O is the above equation is the combined overhead arising from inter-frame spacing (IFS), PHY layer overhead, MAC aggregation and MAC header overheads. This permits the receiving node to calculate the Nacctxop as per the above equation. The receiving node can use $CW_{min}$ and $CW_{max}$ or AIFS to control the access frequency that will not violate the required DB. This calculation ensures that the transmitting node is guaranteed the required flow rate every MI. If the flow exceeds the flow rate, then the receiving node can reduce the access frequency by adjusting the $CW_{min}$ or AIFS parameter.

If the mesh node has granted reverse direction access, the number of accesses may be reduced by the number of downstream accesses required. Otherwise, flow control may be relatively the same. For a reverse direction grant, the desired number of medium accesses equation is modified as follows:

Nacctxopnew=Naccesstxop−Naccessdownstream

The mesh node may measure the received signal to noise ($R_{SNR}$) ratio (406), or other channel characteristic or characteristics. The $R_{SNR}$ may be estimated in a number of ways. In one method, the $R_{SNR}$ may be obtained by a mapping from the received signal strength for each received packet from the transmitting node. The $R_{SNR}$ is the ratio of the received signal strength and a noise estimate determined separately. Another method may involve determining the $R_{SNR}$ from the decoder metric which is a byproduct of the packet decoding procedure. The receiver may use averaging to determine the mean $R_{SNR}$ for the link and deduce the achievable link rate based on the operational characteristic of the available modulation and coding schemes. The mesh node may determine the transmission rate at the physical access layer ($R_{PHY}$) (408).

The mesh node may determine if the transmission rate at the physical access layer ($R_{PHY}$) is less than the optimum or relatively optimum transmission rate for the received SNR ($R_{SNR}$) (412). If it is determined that the transmission rate at the physical access layer ($R_{PHY}$) is less than the relatively optimum transmission rate for the received SNR ($R_{SNR}$), then the transmission rate may be increased from $R_{PHY}$ to $R_{SNR}$ (414). A relatively optimum transmission rate may be within about 50 Mbits per second of an optimum transmission rate.

The mesh node may determine the $TxOP_D$ and the $TxOP_M$ (409). The mesh node may compare the $TxOP_M$ with $TxOP_D$ (415) and if it is determined that the $TxOP_M$ is less than $TxOP_D$, then the mesh node may increase $TxOP_M$ to $TxOP_D$ (416).

The mesh node may determine the $OH_D$ and the $OH_M$ (410). The mesh node may compare the measured overheard ($OH_M$) with the desired overhead ($OH_D$) (417). If it is determined that the measured overhead is less than desired overhead, the mesh node may adjust the AIFS time, $CW_{min}$ and TxOP (418). The mesh node may increase the AIFS time or $CW_{min}$ or both to decrease the number of successful contention accesses. The mesh node may also need to increase the TxOP to maintain the desired FR.

The mesh node may determine the bits measured or transmitted ($N_{bits}$) and the bits desired ($N_{bitsdesired}$) (411). The mesh node may then compare the bits measured or transmitted ($N_{bits}$) with the bits desired ($N_{bitsdesired}$) (420). If it is determined that the number of bits measured or transmitted is less than the number of bits desired, the mesh node may adjust the AIFS time, $CW_{min}$ or TxOP (422). The mesh node may increase the TxOP which may increase the FR. The mesh node may also need to decrease the AIFS time or $CW_{min}$ to minimize overhead and maintain the DB.

Figure 5:
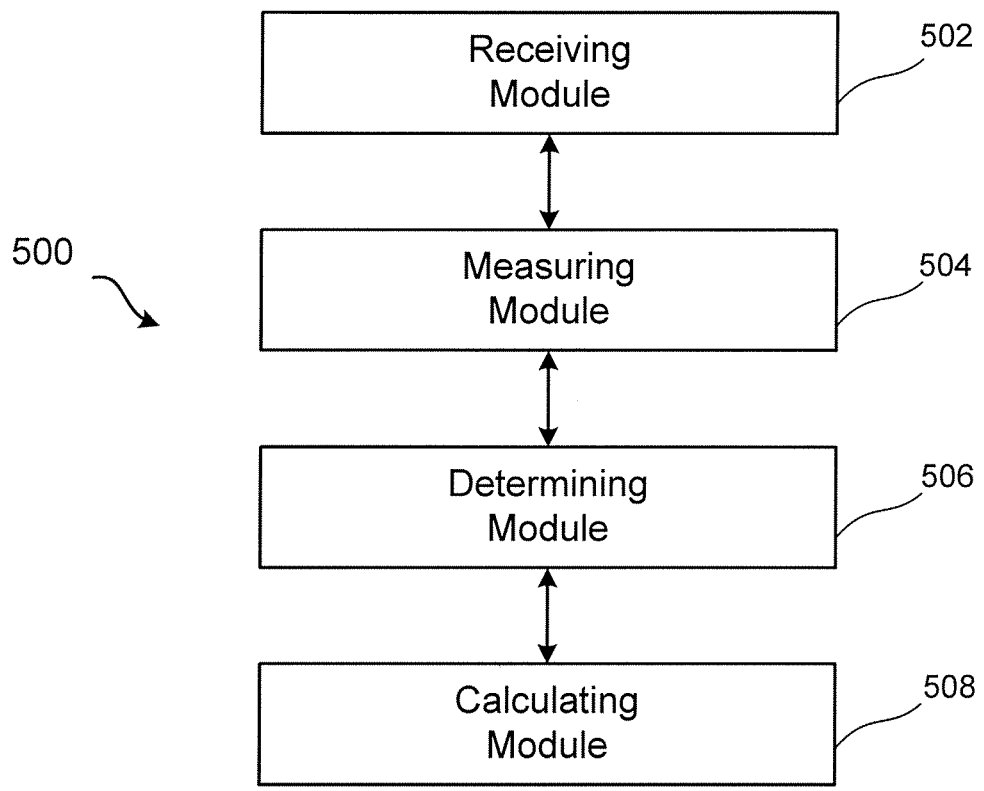
FIG. 5 is a block diagram of an apparatus capable of controlling the flow rate of data according to one or more aspects.

FIG. 5 is a block diagram of an apparatus 500 capable of controlling the flow rate of data according to one or more aspects. The apparatus 500 may include a receiving module 502 capable of receiving a desired flow rate from a mesh node, a measuring module 504 capable of measuring a channel characteristic of data received from the mesh node, a determining module 506 capable of determining a relative optimum transmission rate based at least in part upon the measured SNR, and a calculation module 508 capable of calculating a desired TxOP duration, which may achieve the desired flow rate at the relatively optimum transmission rate. This determination may also be based at least in part upon other parameters.

With respect to FIG. 5, apparatus 500 may comprise one or more processor coupled with a memory. The processors may, in conjunction with software perform the functions discussed herein.

It should be noted that while the above discusses the ranks of the nodes as "higher" or "lower" this may be reversed and other nomenclatures and schemes for routing may be utilized with this approach.

Those skilled in the art will appreciate that the various illustrative logical blocks, modules, circuits, and algorithms described in connection with one or more aspects disclosed herein may be implemented as electronic hardware, computer software, or combinations of both. To illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processing device, a digital signal processing device (DSP), an application specific integrated circuit (ASIC), a field programmable gate array (FPGA) or other programmable logic device, discrete gate or transistor logic, discrete hardware components, or any combination thereof designed to perform the functions described herein. A general purpose processing device may be a microprocessing device, but in the alternative, the processing device may be any conventional processing device, processing device, microprocessing device, or state machine. A processing device may also be implemented as a combination of computing devices, e.g., a combination of a DSP and a microprocessing device, a plurality of microprocessing devices, one or more microprocessing devices in conjunction with a DSP core or any other such configuration.

The apparatus, methods or algorithms described in connection with the embodiments disclosed herein may be embodied directly in hardware, software, or combination thereof. In software the methods or algorithms may be embodied in one or more instructions, stored on a computer readable medium that is part of a computer program product, that may be read and/or executed by a processing device. The instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processing device such the processing device can read information from, and write information to, the storage medium. In the alternative, the storage medium may be integral to the processing device. The processing device and the storage medium may reside in an ASIC. The ASIC may reside in a user terminal. In the alternative, the processing device and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure may be embodied in other specific forms without departing from its spirit or essential characteristics. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A method of controlling a flow of data within a mesh network that includes a plurality of mesh nodes, comprising:
   receiving a transmit specification including a flow rate and a delay bound of a data flow at a first of the plurality of mesh nodes from a second of the plurality of mesh nodes to negotiate admission of the data flow through the first and second mesh nodes, wherein each of the plurality of mesh nodes functions as a wireless repeater that is separated from a given mesh portal within the mesh network by a given number of hops to other mesh nodes, the given mesh portal corresponding to a gateway between the plurality of mesh nodes and one or more external networks;
   measuring, at the first mesh node, a channel characteristic of a channel on which the data flow associated with the received transmit specification will be transmitted on by the second mesh node to the first mesh node;
   determining, at the first mesh node, a desired transmission rate based at least in part on the channel characteristic; and
   determining, at the first mesh node, a transmission opportunity duration to achieve the flow rate at the desired transmission rate for a transmission of the data flow by the second mesh node to the first mesh node.

2. The method of claim 1 further comprising:
   determining a desired overhead to achieve the delay bound at the desired transmission rate; and
   adjusting a medium access parameter to achieve the desired overhead.

3. The method of claim 2 wherein the desired overhead is the minimum overhead required to achieve the delay bound.

4. The method of claim 2 further comprising receiving a reverse direction grant from the second mesh node.

5. The method of claim 2 wherein the desired overhead is the minimum overhead required to accommodate a reverse direction flow and achieve the delay bound.

6. The method of claim 1 wherein the transmission opportunity duration is determined at least in part by the equation:

$$TxOP_D = MAC - OH + \frac{Nbits}{Rsnr} + \delta;$$

where $TxOP_D$ represents the TxOP duration;
where MAC-OH represents media access control overhead;
where Nbits represents the number of bits transmitted;
where Rsnr represents a signal to noise ratio; and
where $\delta$ represents a time pad.

7. The method of claim 1 further comprising determining a contention window parameter to achieve the flow rate at the desired transmission rate.

8. The method of claim 7, wherein the contention window parameter corresponds to a contention window threshold value.

9. The method of claim 8, wherein the contention window threshold value corresponds to a minimum value associated with a range of a contention window.

10. The method of claim 1 further comprising determining an arbitration inter-frame space time to achieve the flow rate at the desired transmission rate.

11. The method of claim 1, wherein the data flow corresponds to an upstream data flow that originates from one of the plurality of mesh nodes and is intended for transmission to the one or more external networks through the given mesh portal.

12. The method of claim 11, wherein the first mesh node forwards the data flow from the second mesh node to the given mesh portal via hopping to one or more additional mesh nodes.

13. The method of claim 11, wherein the second mesh node directly or indirectly receives from the data flow originator mesh node.

14. The method of claim 1, wherein the data flow corresponds to a downstream data flow that arrives at the given mesh portal and is intended for transmission to a destination node among the plurality of mesh nodes.

15. The method of claim 14, wherein the first mesh node forwards the data flow from the second mesh node to the destination node via hopping to one or more additional mesh nodes.

16. The method of claim 14, wherein the second mesh node directly or indirectly receives from the data flow from the given mesh portal.

17. The method of claim 1, wherein the given mesh portal corresponds to a Wireless Local Area Network (WLAN) Access Point.

18. The method of claim 17, wherein the WLAN Access Point operates in accordance with Institute for Electrical and Electronics Engineers (IEEE) 802.11.

19. A method for controlling a flow of data in a mesh network that includes a plurality of mesh nodes, comprising:
determining a desired flow rate, an achievable data rate on a link and a media access control overhead;
determining an access rate from a desired delay bound using an arbitration inter-frame space time and a contention window parameter; and
selecting a transmission opportunity duration for a transmission of a data flow between a first of the plurality of mesh nodes and a second of the plurality of mesh nodes based on at least one of the desired flow rate, the achievable data rate on the link or the media access control overhead,
wherein each of the plurality of mesh nodes functions as a wireless repeater that is separated from a given mesh portal within the mesh network by a given number of hops to other mesh nodes, the given mesh portal corresponding to a gateway between the plurality of mesh nodes and one or more external networks.

20. The method of claim 19 further comprising adjusting access parameters based on at least one of the desired flow rate, the achievable data rate on the link, a measured signal to noise ratio or an access success or failure rate.

21. The method of claim 19 further comprising adjusting the transmission opportunity duration based on at least one of the desired flow rate, the achievable data rate on the link, a measured signal to noise ratio or an access success or failure rate.

22. The method of claim 19 wherein the media access control overhead is selected from a group consisting of a preamble, an inter-frame spacing, and a block acknowledgement.

23. A non-transitory computer readable medium containing instructions stored thereon, which, when executed by a first mesh node within a mesh network that includes a plurality of mesh nodes, cause the first mesh node to perform operations, the instructions including:
instructions for processing a received transmit specification including a flow rate and a delay bound of a data flow from a second of the plurality of mesh nodes to negotiate admission of the data flow through the first and second mesh nodes, wherein each of the plurality of mesh nodes functions as a wireless repeater that is separated from a given mesh portal within the mesh network by a given number of hops to other mesh nodes, the given mesh portal corresponding to a gateway between the plurality of mesh nodes and one or more external networks;
instructions for measuring a channel characteristic of a channel on which the data associated with the received transmit specification will be transmitted on from the second mesh node to the first mesh node;
instructions for determining a desired transmission rate based at least in part on the channel characteristic; and
instructions for determining a transmission opportunity duration to achieve the flow rate at the desired transmission rate for a transmission of the data flow by the second mesh node to the first mesh node.

24. An apparatus for controlling a flow of data within a mesh network that includes a plurality of mesh nodes, the apparatus corresponding to a first of the plurality of mesh nodes, comprising:
a receiving module configured to receive a transmit specification including a flow rate and a delay bound of a data flow from a second of the plurality of mesh nodes to negotiate admission of the data flow through the first and second mesh nodes, wherein each of the plurality of mesh nodes functions as a wireless repeater that is separated from a given mesh portal within the mesh network by a given number of hops to other mesh nodes, the given mesh portal corresponding to a gateway between the plurality of mesh nodes and one or more external networks;
a measuring module configured to measure a channel characteristic of a channel on which the data associated with the received transmit specification will be transmitted on from the second mesh node to the first mesh node; and
a determining module configured to determine a desired transmission rate based at least in part on the channel characteristic and determine a transmission opportunity duration to achieve the flow rate at the desired transmission rate for a transmission of the data flow by the second mesh node to the first mesh node,
wherein one or more of the receiving module, the measuring module and the determining module includes a hardware component.

25. The apparatus of claim 24 further comprising an adjusting module configured to adjust a medium access parameter to achieve the desired overhead and wherein the receiving module is further configured to receive the transmit specification including the delay bound of the data flow from the mesh node and the determining module is further configured to determine a desired overhead to achieve the delay bound at the desired transmission rate.

26. The apparatus of claim 25 wherein the desired overhead is the minimum overhead required to achieve the delay bound.

27. The apparatus of claim 25 wherein the receiving module is further configured to receive a reverse direction grant from the second mesh node.

28. The apparatus of claim 25 wherein the desired overhead is the minimum overhead required to accommodate a reverse direction flow and achieve the delay bound.

29. The apparatus of claim 24 wherein the transmission opportunity duration is determined at least in part by the equation:

$$TxOP_D = MAC-OH + \frac{Nbits}{Rsnr} + \delta;$$

where $TxOP_D$ represents the TxOP duration;
where MAC-OH represents media access control overhead;
where Nbits represents the number of bits transmitted;
where Rsnr represents a signal to noise ratio; and
where $\delta$ represents a time pad.

30. The apparatus of claim 24 wherein the determining module is further configured to determine a contention window parameter to achieve the flow rate at the desired transmission rate.

31. The apparatus of claim 24 wherein the determining module is further configured to determine an arbitration inter-frame space time to achieve the flow rate at the desired transmission rate.

32. An electronic device for controlling a data flow within a mesh network that includes a plurality of mesh nodes, the electronic device corresponding to a first of the plurality of mesh nodes, comprising:
a processor configured to measure a channel characteristic of a channel on which data associated with a transmit specification that is received from a second of the plurality of mesh nodes, including a desired flow rate and a delay bound for the data flow, will be transmitted on, from the second mesh node to the first mesh node, to negotiate admission of the data flow through the first and second mesh nodes, to determine a desired transmission rate based at least in part on the channel characteristic, and to determine a transmission opportunity duration to achieve the flow rate at the desired transmission rate for a transmission of the data flow by the second mesh node to the first mesh node; and
a memory coupled to the processor,
wherein each of the plurality of mesh nodes functions as a wireless repeater that is separated from a given mesh portal within the mesh network by a given number of hops to other mesh nodes, the given mesh portal corresponding to a gateway between the plurality of mesh nodes and one or more external networks.

33. The electronic device of claim 32 wherein the processor is further configured to adjust a medium access parameter to achieve the desired overhead, to receive the delay bound of the data flow from the mesh node, and to determine a desired overhead to achieve the delay bound at the desired transmission rate.

34. The electronic device of claim 33 wherein the desired overhead is the minimum overhead required to achieve the delay bound.

35. The electronic device of claim 33 wherein the processor is configured to receive a reverse direction grant from the second mesh node.

36. The electronic device of claim 33 wherein the desired overhead is the minimum overhead required to accommodate a reverse direction flow and achieve the delay bound.

37. The electronic device of claim 32 wherein the processor is configure to determine the transmission opportunity duration at least in part by the equation:

$$TxOP_D = MAC-OH + \frac{Nbits}{Rsnr} + \delta;$$

where $TxOP_D$ represents the TxOP duration;
where MAC-OH represents media access control overhead;
where Nbits represents the number of bits transmitted;
where Rsnr represents a signal to noise ratio; and
where $\delta$ represents a time pad.

38. The electronic device of claim 32 wherein the processor is further configured to determine a contention window parameter to achieve the flow rate at the desired transmission rate.

39. The electronic device of claim 38 wherein the processor is further configured to determine an arbitration inter-frame space time to achieve the flow rate at the desired transmission rate.

40. An apparatus for controlling a flow of data within a mesh network that includes a plurality of mesh nodes, the apparatus corresponding to a first of the plurality of mesh nodes, comprising:
means for receiving a transmit specification including a flow rate and a delay bound of a data flow from a second of the plurality of mesh nodes to negotiate admission of the data flow through the first and second mesh nodes, wherein each of the plurality of mesh nodes functions as a wireless repeater that is separated from a given mesh portal within the mesh network by a given number of hops to other mesh nodes, the given mesh portal corresponding to a gateway between the plurality of mesh nodes and one or more external networks;
means for measuring a channel characteristic of a channel on which the data associated with the received transmit specification will be transmitted on from the second mesh node to the first mesh node;
means for determining a desired transmission rate based at least in part on the channel characteristic; and
determining a transmission opportunity duration to achieve the flow rate at the desired transmission rate for a transmission of the data flow by the second mesh node to the first mesh node.

41. The apparatus of claim 40 further comprising:
means for receiving the transmit specification including a delay bound of the data from the mesh node;

means for determining a desired overhead to achieve the delay bound at the desired transmission rate; and means for adjusting a medium access parameter to achieve the desired overhead.

42. The apparatus of claim 41 wherein the desired overhead is the minimum overhead required to achieve the delay bound.

43. The apparatus of claim 41 further comprising means for receiving a reverse direction grant from the second mesh node.

44. The apparatus of claim 41 wherein the desired overhead is the minimum overhead required to accommodate a reverse direction flow and achieve the delay bound.

45. The apparatus of claim 40 wherein the transmission opportunity duration is determined at least in part by the equation:

$$TxOP_D = MAC - OH + \frac{Nbits}{Rsnr} + \delta;$$

where $TxOP_D$ represents the TxOP duration;
where MAC-OH represents media access control overhead;
where Nbits represents the number of bits transmitted;
where Rsnr represents a signal to noise ratio; and
where $\delta$ represents a time pad.

46. The apparatus of claim 40 further comprising means for determining a contention window parameter to achieve the flow rate at the desired transmission rate.

47. The apparatus of claim 40 further comprising means for determining an arbitration inter-frame space time to achieve the flow rate at the desired transmission rate.

48. A non-transitory computer readable medium having instructions stored thereon, which, when executed by a given mesh node within a mesh network that includes a plurality of mesh nodes, cause the given mesh node to perform operations, the instructions including:

instructions for determining a desired flow rate, an achievable data rate on a link and a media access control overhead;

instructions for determining an access rate from a desired delay bound using an arbitration inter-frame space time and a contention window parameter; and instructions for selecting a transmission opportunity duration for a transmission of a data flow between a first of the plurality of mesh nodes and a second of the plurality of mesh nodes based on at least one of the desired flow rate, the achievable data rate on the link or the media access control overhead, wherein each of the plurality of mesh nodes functions as a wireless repeater that is separated from a given mesh portal within the mesh network by a given number of hops to other mesh nodes, the given mesh portal corresponding to a gateway between the plurality of mesh nodes and one or more external networks.

49. An electronic device configured to control a flow of data within a mesh network that includes a plurality of mesh nodes, comprising:

means for determining a desired flow rate, an achievable data rate on a link and a media access control overhead;

means for determining an access rate from a desired delay bound using an arbitration inter-frame space time and a contention window parameter; and means for selecting a transmission opportunity duration for a transmission of a data flow between a first of the plurality of mesh nodes and a second of the plurality of mesh nodes based on at least one of the desired flow rate, the achievable data rate on the link or the media access control overhead, wherein each of the plurality of mesh nodes functions as a wireless repeater that is separated from a given mesh portal within the mesh network by a given number of hops to other mesh nodes, the given mesh portal corresponding to a gateway between the plurality of mesh nodes and one or more external networks.

* * * * *